United States Patent
Mursia et al.

(10) Patent No.: US 11,245,557 B2
(45) Date of Patent: Feb. 8, 2022

(54) METHOD, SOFTWARE AND DEVICE FOR GENERATING CHANNEL ESTIMATES

(71) Applicant: Intel IP Corporation, Santa Clara, CA (US)

(72) Inventors: Placido Mursia, Antibes (FR); Stefan Fechtel, Zorneding (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/041,490

(22) PCT Filed: Jun. 7, 2018

(86) PCT No.: PCT/EP2018/064988
§ 371 (c)(1),
(2) Date: Sep. 25, 2020

(87) PCT Pub. No.: WO2019/233581
PCT Pub. Date: Dec. 12, 2019

(65) Prior Publication Data
US 2021/0135915 A1    May 6, 2021

(51) Int. Cl.
*H04L 27/26*    (2006.01)
*H04L 5/00*    (2006.01)
(Continued)

(52) U.S. Cl.
CPC ........ *H04L 27/2602* (2013.01); *H04L 5/0007* (2013.01); *H04L 25/0228* (2013.01);
(Continued)

(58) Field of Classification Search
CPC ............... H04L 27/2602; H04L 5/0007; H04L 25/0228; H04L 25/0248; H04L 27/2647; H04L 43/0852
See application file for complete search history.

(56) References Cited

U.S. PATENT DOCUMENTS 8,260,208 B2 * 9/2012 Auer ................... H04L 25/0232
455/67.11
2006/0176941 A1  8/2006 Nieto et al.
(Continued)

FOREIGN PATENT DOCUMENTS

JP        2015012610 A      1/2015

OTHER PUBLICATIONS

Özdemir, M. et al., "Toward Real-Time Adaptive Low-Rank LMMSE Channel Estimation of MIMO-OFDM Systems", IEEE Transactions on Wireless Communications, Oct. 1, 2006, pp. 2675-2678, vol. 5, No. 10, IEEE, Piscataway, New Jersey, USA.
(Continued)

*Primary Examiner* — Janice N Tieu
(74) *Attorney, Agent, or Firm* — Viering, Jentschura & Partner mbB (57) ABSTRACT

A method of generating channel estimates of a communication channel in an OFDM system includes receiving references symbols from at least one time frequency observation block of a predetermined block size in frequency and time; generating subspace-transformed reference symbols from the received reference symbols; and subspace filtering the subspace-transformed reference symbols to generate a channel estimate for a communication channel target time; wherein a latency between a communication channel time instant of a currently received reference symbol and the communication channel target time is smaller than the observation block size in time.

15 Claims, 6 Drawing Sheets

(51) Int. Cl.
  *H04L 25/02* (2006.01)
  *H04L 12/26* (2006.01)
(52) U.S. Cl.
  CPC ...... *H04L 25/0248* (2013.01); *H04L 27/2647* (2013.01); *H04L 43/0852* (2013.01)

(56) References Cited

U.S. PATENT DOCUMENTS

| | | | |
|---|---|---|---|
| 2010/0067366 A1 | 3/2010 | Nicoli | |
| 2010/0254473 A1* | 10/2010 | Wu | H04B 17/373 375/267 |
| 2011/0038445 A1 | 2/2011 | Zhou et al. | |
| 2013/0188757 A1 | 7/2013 | Kalyani et al. | |
| 2015/0003573 A1 | 1/2015 | Fechtel et al. | |
| 2015/0236872 A1 | 8/2015 | Xiong et al. | |
| 2019/0074999 A1 | 3/2019 | Fechtel | |
| 2019/0253282 A1* | 8/2019 | Hadaschik | H04L 25/0204 |
| 2020/0052931 A1 | 2/2020 | Fechtel | |

OTHER PUBLICATIONS

Miriyala, G. et al., "Reduced Complexity Channel Estimation Method for Multi Input Multi Output-Orthogonal Frequency Division Multiplexing Systems by Subspace Tracking", 2013 3rd IEEE International Advance Computing Conference (IACC), Feb. 22, 2013, pp. 470-475, IEEE, Ghaziabad, India.

International Search Report issued for the corresponding international application No. PCT/EP2018/064988, dated Feb. 21, 2019, 3 pages (for informational purpose only).

Yun, T. et al., "MIMO-OFDM channel estimation based on distributed compressed sensing and Kalman filter", 2011 IEEE International Conference on Signal Processing, Communications and Computing (ICSPCC), Sep. 2011, 4 pages, IEEE, Xi'an, China.

Chen, W. et al., "Kalman-filter channel estimator for OFDM systems in time and frequency-selective fading environment", 2004 IEEE International Conference on Acoustics, Speech, and Signal Processing, May 2004, 4 pages, IEEE, Montreal, Que., Canada.

Huang, M. et al., "Kalman-filter-based channel estimation for orthogonal frequency-division multiplexing systems in time-varying channels", IET Communications, Aug. 2007, pp. 795-801, IET, vol. 1, Issue 4.

3GPP TS 36.211, "3rd Generation Partnership Project; Technical Specification Group Radio Access Network; Evolved Universal Terrestrial Radio Access (E-UTRA); Physical channels and modulation (Release 12)", Sep. 2015, V12.7.0, 136 pages.

Lee et al.; "Low-rank pilot-symbol-aided channel estimation for MIMO-OFDM systems"; dated 2004, published in IEEE 60th Vehicular Technology Conference; vol. 1; Sep. 26, 2004; pp. 469-473, IEEE Piscataway, New Jersey, USA.

\* cited by examiner

METHOD, SOFTWARE AND DEVICE FOR GENERATING CHANNEL ESTIMATES

FIELD

The disclosure relates to a method, software and device for generating channel estimates in an OFDM system, in particular in 4G and 5G mobile networks.

BACKGROUND

In communication system, the mobile user equipment (UE) is faced not only with varying channel conditions but also multiple interfering cells whose signals and channels likewise exhibit time/frequency-selective behavior. Therefore, channel estimation (CE) is key to the proper receiver operation. CE is also one of the most complex receiver functions in terms of computational load and memory footprint.

LTE/NR cellular devices are required to process ever-increasing data rates (Gbit/s) and bandwidths (hundreds of MHz). To master these increasing demands, novel concepts to reduce CE computational load and memory footprint are sought. Nevertheless, performance and latency must not be compromised.

BRIEF DESCRIPTION OF THE DRAWINGS

The accompanying drawings are included to provide a further understanding of aspects of the disclosure and are incorporated in and constitute a part of this specification. The drawings illustrate aspects of the disclosure and together with the description serve to explain principles of the various aspects. Other aspects of the disclosure and many of the intended advantages of these aspects will be readily appreciated as they become better understood by reference to the following detailed description.

DETAILED DESCRIPTION

In the following detailed description, reference is made to the accompanying drawings, which form a part thereof, and in which is shown by way of illustration specific aspects in which aspects of the disclosure described herein may be practiced. It is understood that other aspects may be utilized and structural or logical changes may be made without departing from the scope of the present disclosure. The following detailed description, therefore, is not to be taken in a limiting sense, and the scope of the present invention is defined by the appended claims.

It is understood that statements made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The techniques described herein may be implemented in wireless communication networks, in particular communication networks based on mobile communication standards such as LTE (Long Term Evolution), in particular the advanced version LTE-A thereof and/or OFDM and successor standards such as 4G, 5G and beyond. The methods are also applicable for high speed communication standards from the IEEE 802.11 family according to the WiFi alliance, e.g. IEEE 802.11ad and successor standards (IEEE: Institute of Electrical and Electronics Engineers).

The methods, software and devices described below may be implemented in electronic devices such as access points and base stations or cellular handsets, UEs and mobile or wireless devices and data terminals. The devices may include integrated circuits and/or passives and may be manufactured according to various technologies.

Aspects of the disclosure and/or functionality and/or data processing described in this disclosure can be implemented in digital electronic circuitry, or in computer hardware, firmware, software, or in combinations thereof, e.g. in software operating on available hardware of mobile devices or in new hardware dedicated for processing the methods described herein.

The methods and devices described hereinafter may be applied in OFDM (Orthogonal Frequency Division Multiplex) systems. OFDM is a scheme for encoding digital data on multiple sub-carrier frequencies. A large number of closely spaced orthogonal sub-carrier signals may be used to carry data. Due to the orthogonality of the sub-carriers crosstalk between sub-carriers may be suppressed.

Figure 1:
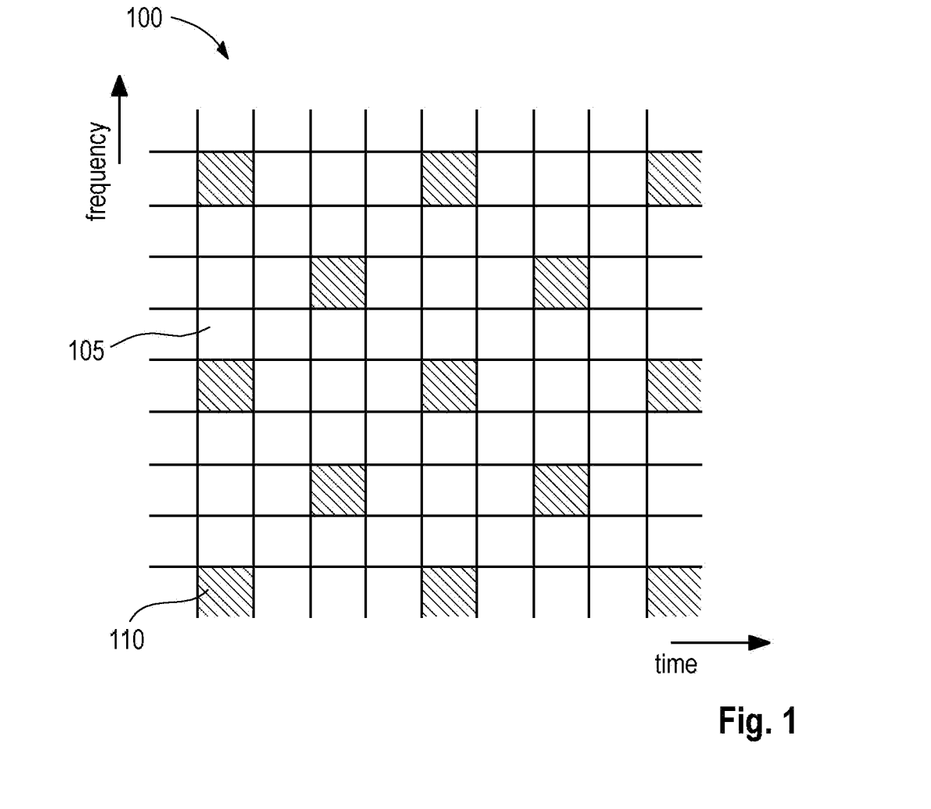
FIG. 1 is a frequency-time plane of an OFDM communication channel.

FIG. 1 displays a frequency-time plane 100 of an OFDM communication channel. A horizontal axis of the frequency-time plane 100 represents time and a vertical axis represents frequency. The time dimension is divided into time slots of the communication channel, while the frequency dimension is divided into subcarriers of the communication channel. Each square of the frequency-time plane 100 represents a radio resource element (RE) of the communication channel. A RE may be the smallest discrete part of the communication channel. Hence, the frequency-time plane 100 may represent the RE grid of the OFDM system.

Each RE may be associated with a channel coefficient representing the distortion of a symbol which is communicated at this RE. Channel estimation means to estimate the channel coefficient for a RE of the communication channel. To this end, reference symbols (RS) may be transmitted over the communication channel. A receiver of the telecommunication system may have an a priori knowledge about the (undistorted) transmitted RS. The receiver can determine the channel coefficient of a radio RE that is associated with a RS by comparing the received distorted RS with the a priori knowledge of the undistorted transmitted RS.

In FIG. 1, shaded squares represent REs 110 that are associated with RSs and cleared squares represent REs 105 that can be used for communication data (e.g. payload data).

By way of example, in LTE the frequency-time plane 100 is organized in resource blocks spanning, e.g., 12 subcarriers in frequency dimension and, e.g., 6, 7 or any other suitable number of symbols (each corresponding to a slot in FIG. 1) in time dimension. A resource block (RB) in LTE may have a duration of 0.5 ms (corresponding to one LTE-slot) and a bandwidth of 12×15 kHz (it is to be noted that the term slot used in FIG. 1 for an RE spacing in time corresponds to the term symbol in LTE, while an LTE-slot may contain 6, 7 or any other suitable number of symbols).

Channel estimation in existing systems may be performed in the observation space. A received plurality of RS can be written as a vector y (e.g., a column vector). If the received plurality of RS includes a number of N (N=1, 2, 3, . . . ) RSs, the vector y can be element of an N-dimensional complex number space $\mathbb{C}^N$. The channel coefficients whose radio RE are associated with the received plurality y of RS can be written as a vector h (e.g., a column vector). Since the vector h can include a channel coefficient for each RE associated with one of the RS, the vector h can also be element of the N-dimensional complex number space $\mathbb{C}^N$.

The index t denotes target and designates a particular RE in the frequency-time plane whose channel coefficient is to be estimated. A channel coefficient of a targeted RE may be expressed by $$\hat{h}_t = w_t^H y \quad (1)$$

with (observation space) filter coefficient $w_t$ according to $$w_t = (R_{hh} + R_{nn})^{-1} r_{ht}. \quad (2)$$

Here, $R_{hh}$ is the e.g. N×N-dimensional channel autocorrelation matrix which can be expressed by $$R_{hh} = E\{hh^H\}, \quad (3)$$

and $R_{nn}$ is the e.g. N×N-dimensional interference and/or noise correlation matrix which can be expressed by $$R_{nn} = E\{nn^H\}, \quad (4)$$

where E{ } denotes the expectation operator, the superscript H is the Hermitian operator, and $r_{ht}$ is the channel cross-correlation column vector of, e.g., dimension N (i.e., element of $\mathbb{C}^N$) associated with target RE t. In this text, vectors and matrices are written in bold type, while normal type is used for natural, real and complex numbers.

A recent approach to channel estimation filtering is so called subspace filtering. Conventional MMSE (minimum mean square error) filtering according to equation (1) with filter coefficients of equation (2) is replaced by subspace filtering. Subspace filtering may include:

(a) Block Transform to Subspace

Subspace mapping a plurality of demodulated RSs of a block b, denoted by $y_b$, to a subspace of a dimension L equal to or smaller than dimension N (i.e. L N) can be written as $$z_b = V_L^H y_b, \quad (5)$$

where $V_L^H$ is the Hermitian transpose of the subspace mapping matrix $V_L$ (e.g., element of $\mathbb{C}^{N \times L}$) and $z_b$ (e.g., element of $\mathbb{C}^L$) is the vector of the subspace-transformed RSs of block b. The demodulated RSs of block b may be written as $y_b = h_b + n_b$, where $h_b$ (e.g., element of $\mathbb{C}^N$) is a vector of the channel coefficients for each of the radio REs associated with one of the N received RSs of block b and $n_b$ (e.g., element of $\mathbb{C}^N$) is a vector which represents noise and/or interference at the radio REs associated with the N received RSs of block b (i.e. with the elements of $y_b$).

(b) Block Aggregation

Optionally, a block aggregation of vectors of the subspace-transformed RSs, $z_b$, is performed over a plurality of blocks, i.e. b=1, . . . , B, where B is the number of blocks used for block aggregation $$\bar{z} = \begin{bmatrix} z_1 \\ \vdots \\ z_B \end{bmatrix}, \quad (6)$$

where the vector of block aggregated subspace-transformed RSs, $\bar{z}$, may be an element of $\mathbb{C}^{BL}$.

(c) Subspace Filtering

Filtering in subspace (note that if (b) was performed, subspace filtering is an inter-block subspace filtering) may be carried out according to $$\hat{h}_t = \bar{b}_t^H \bar{z}, \quad (7)$$

where a vector of subspace filter coefficients $\bar{b}_t$ (e.g., element of $\mathbb{C}^{BL}$) related to target position(s) t may be given by $$\bar{b}_t = \bar{R}_{zz}^{-1} \bar{r}_{zt}, \quad (8)$$

with the transformed aggregated block RS autocorrelation matrix (e.g., element of $\mathbb{C}^{BL \times BL}$)

$$\bar{R}_{zz} = \begin{bmatrix} V_L^H R_{hh,1} V_L & \cdots & V_L^H R_{hh,B} V_L \\ \vdots & \ddots & \vdots \\ V_L^H R_{hh,B}^H V_L & \cdots & V_L^H R_{hh,1} V_L \end{bmatrix} + \sigma^2 I \quad (9)$$

and the transformed aggregated block RS cross-correlation vector (e.g., element of $\mathbb{C}^{BL}$)

$$\bar{r}_{zt} = \begin{bmatrix} V_L^H r_{h,1,t} \\ \vdots \\ V_L^H r_{h,B,t} \end{bmatrix}. \quad (10)$$

Here, $\sigma^2$ denotes the noise power of the communication channel.

Here, an RS cross-block channel autocorrelation matrix may be given by $R_{hh,b}=E\{h_i h_{i+b}^H\}$, and a RS/RE channel cross-correlation vector may be given by $r_{h,i,t}=E\{h_i h_t^*\}$, where $h_t$ is the (complex) channel coefficient of a target radio RE. The superscript * denotes the complex-conjugate operator. I is the identity matrix of, e.g., dimension BL×BL.

As to (a), subspace filtering allows to significantly reduce the complexity and computational effort of CE filtering and other critical operations. Various approaches of constructing a suitable subspace mapping matrix $V_L$ are viable, e.g. constructing the subspace mapping matrix by eigen-decomposition, QR-decomposition, or Cholesky-decomposition. In the following, by way of example and without loss of generality, the eigen-decomposition approach is exemplified.

Via eigenvalue/vector decomposition (EVD)

$$R_{hh}=V_L \Lambda_L V_L^H \quad (11)$$

of the channel autocorrelation matrix $R_{hh}$, where $\Lambda_L$ is a diagonal eigenvalue matrix from $\mathbb{C}^{L \times L}$ comprising, e.g., the largest L eigenvalues of $R_{hh}$ (or by any other subspace-generating transform), a low-rank subspace spanned by the L eigenvectors $v_1, \ldots, v_L$ corresponding to the selected largest L eigenvalues of $R_{hh}$ is formed. Each eigenvector $v_1, \ldots, v_L$ may be an element of $\mathbb{C}^N$. A suitable subspace mapping matrix $V_L$ from $\mathbb{C}^{N \times L}$ as obtained by EVD may then be written as $$V_L=[v_1, \ldots, v_L]. \quad (12)$$

Figure 2:
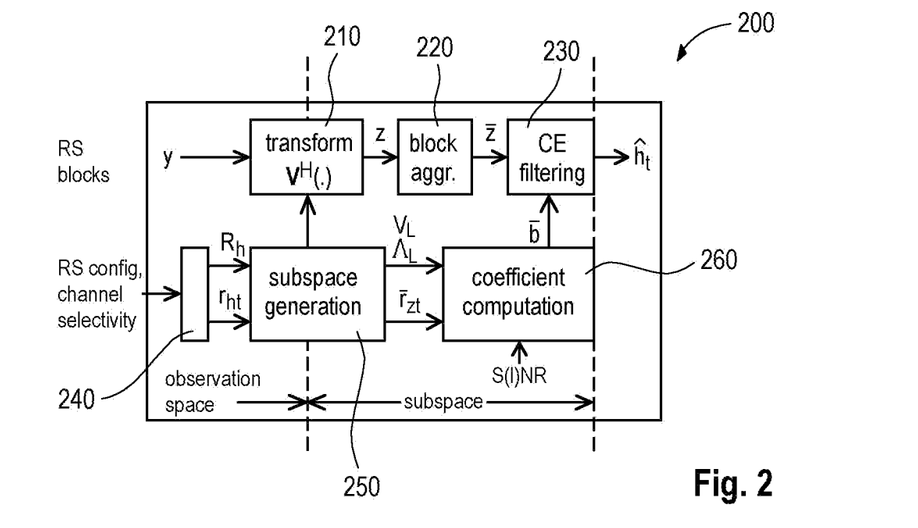
FIG. 2 is a block diagram illustrating an exemplary method of subspace channel estimation based on time-frequency observation blocks.
Figure 3:
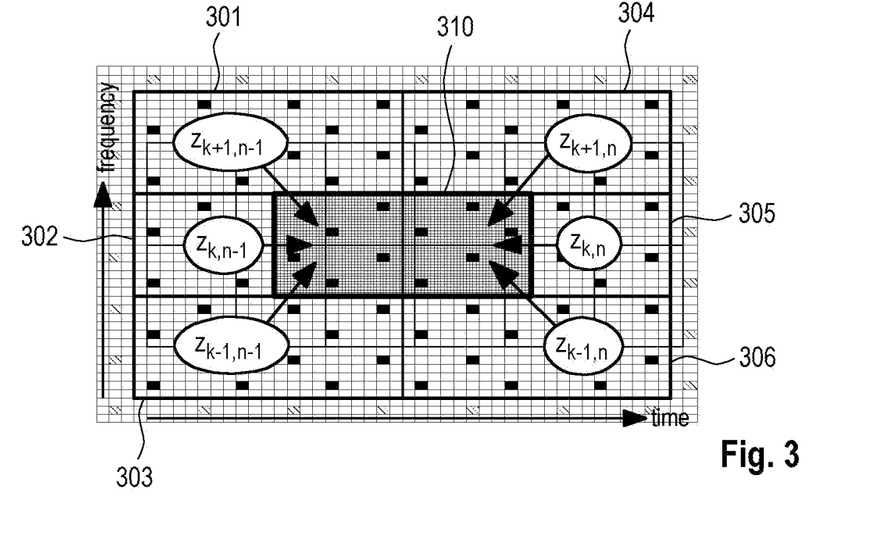
FIG. 3 is a frequency-time plane illustrating subspace channel estimation filtering based on time-frequency observation blocks.

FIGS. 2 and 3 illustrate various aspects of an exemplary method of subspace CE based on time-frequency observation blocks. As an example, a 2-dimensional (2D) F/T (frequency/time) plane and a LTE-like RS grid (depicted by shaded squares in FIG. 3) is used.

FIG. 2 illustrates an example of a method and/or apparatus 200 for computing a channel coefficient $\hat{h}_t$ of a targeted RE by subspace filtering (see equation (7)). Block 210 may relate to the computation associated with equation (5). Block 220 may relate to the computation associated with equation (6). Block 230 may relate to the computation associated with equation (7). Block 240 may relate to the computation of the RS cross-block channel autocorrelation matrix $R_{hh,b}$ and the RS/RE channel cross-correlation vector $r_{h,i,t}$. Block 250 may relate to the computation associated with equations (10) and (11). Block 260 may relate to the computation associated with equations (8) and (9).

Further, the computation of block 260 may, e.g., be based on the signal-to-noise ratio (SNR) and/or the signal-to-noise plus interference ratio (SINR). By way of example, considering white Gaussian noise, the term $\sigma^2 I$ of equation (9) may be derived from the S(I)NR.

FIG. 3 shows by way of example a number of B=6 blocks 301, 302, 303, 304, 305, 306 and a target region 310 located in the center region of the blocks 301, 302, 303, 304, 305, 306. Subspace CE in the above-explained form uses complete blocks 301, 302, 303, 304, 305, 306 in the 2D F/T (frequency/time) plane in order to produce channel estimates for the target region 310.

The block size of the blocks 301, 302, 303, 304, 305, 306 is an adjustable computational parameter. It has a significant influence on the CE performance and the required hardware expenditure. The sweet spot of this scheme is a block size close to the channel coherence length $L_c$ in either direction, as this improves performance and reduces memory size. However, e.g. for limited mobility (small Doppler), blocks can become very large in time direction, which entails long delays until blocks are completely processed and channel estimates become available. However, many applications and design considerations, including modem KPI (key performance indicators), data buffering limitations, and F/T region fragmentation all call for low latency CE.

A potential way to reduce latency would be to reconfigure the block size, e.g., to make blocks smaller, or to use more blocks in time direction. However, using smaller and/or too many blocks will compromise the complexity benefits of subspace channel estimation and thus may compromise the overall CE performance.

In the following are described aspects to arrive at low latency for subspace CE block processing.

Figure 4:
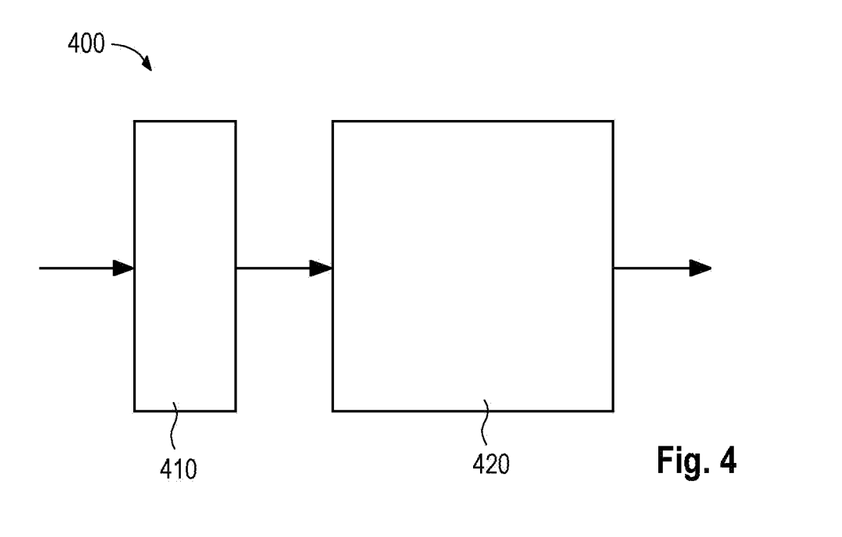
FIG. 4 is a block diagram illustrating an exemplary method of subspace channel estimation based on time-frequency observation blocks at multiple communication channel time instants over the observation block size in time.

FIG. 4 illustrates an exemplary method 400 of subspace channel estimation of time-frequency observation blocks at multiple time instants over the observation block size in time. At an input of operation 410 reference symbols (RSs) are received from at least one time-frequency observation block (e.g. block(s) 304, 305, 306) of a predetermined block size in frequency and time. Each received RS is associated with a communication channel time instant, see the time axis of FIG. 3.

At operation 410 subspace-transformed reference symbols (RSs) are generated from the received RSs. The subspace-transformed RSs are provided at an output of operation 410.

At operation 420 the subspace-transformed RSs are subspace filtered to generate a channel estimate for a communication channel target time. The channel estimate for a communication channel target time is provided at an output of operation 420. A latency between a communication channel time instant of a currently received reference symbol and the communication channel target time is smaller than the observation block size in time. As subspace filtering may be performed multiple times per time-frequency observation block, multiple channel estimates per time-frequency observation block (in time direction) are generated.

As the latency of a channel estimate relative to the time instant of the latest RSs used to generate the channel estimate is smaller than the observation block size in time, the latency of channel estimation can be reduced without reducing the block size in time. Therefore, as block size in time and latency are individually adjustable, the latency may be reduced without compromising the complexity benefits of subspace channel estimation (which is dependent on a block size set close to the channel coherence length $L_c$ in time direction).

First Aspect of the Disclosure

According to a first aspect of the disclosure, block rate subspace filtering as outlined with respect to FIG. 2 is replaced by an over block rate subspace filtering, which may include:

(a) Partial Block Transform to Subspace

Considering by way of example the 2D configuration B×2 (2 blocks in time direction), the latest blocks $z_{k,n}$ in time may not be transformed as a whole (see equation (5)) but accumulated in parts (e.g., per RS-OFDM symbol) e.g. by $$z_{k,n}[l]=z_{k,n}[l-1]+V_L^H[l]y_{k,n}[l] \quad (13)$$

with RS vector $y_{k,n}[l]$ (length K[l] pertaining to OFDM index l of block $y_{k,n}$ (e.g., RS-OFDM symbol of index l)) and $V_L[l]$ being the corresponding part of the transform matrix $V_L$. Note that subspace filtering according to equation (13) may be iterative (recursive), i.e. the partial subspace-transformed RS is accumulated to previous partial subspace-transformed RS. Note that subspace filtering as given by equation (13) is an example of the general concept of intra-block accumulation for partial block transform to subspace.

(b) Partial Block Aggregation

Optionally, an aggregation of vectors of the partially subspace-transformed RSs $z_{k,n}[l]$ and the subspace-transformed RSs $z_{k,n-1}$ of previous blocks in frequency and time is performed, e.g., according to $$z_{n-1} = \begin{bmatrix} z_{k_1,n-1} \\ \vdots \\ z_{k_B,n-1} \end{bmatrix} z_n[l] = \begin{bmatrix} z_{k_1,n}[l] \\ \vdots \\ z_{k_B,n}[l] \end{bmatrix} \quad (14a)$$

and $$\bar{z}[l] = \begin{bmatrix} z_{n-1} \\ z_n[l] \end{bmatrix}, \quad (14b)$$

wherein equation (14a) relates to frequency aggregation and equation (14b) relates to time aggregation. Hence, $\bar{z}[l]$ is the vector of block aggregated partially subspace-transformed RSs and may be an element of $\mathbb{C}^{BL}$.

(c) Subspace Filtering

Filtering in subspace (note that if (b) was performed, subspace filtering is an inter-block subspace filtering) may be carried out for a certain target region as $$\hat{h}_t = \bar{b}_t^H[l]\bar{z}[l], \quad (15)$$

where a vector of partially transformed subspace filter coefficients $\bar{b}_t[l]$ (e.g., element of $\mathbb{C}^{BL}$) related to target position(s) t may be given by $$\bar{b}_t[l] = \bar{R}_{zz}[l]^{-1}\bar{r}_{zt}[l] \quad (16)$$

with the transformed aggregated block RS autocorrelation matrix (e.g., element of $\mathbb{C}^{BL \times BL}$) $\bar{R}_{zz}[l]$ given, e.g., by $$\bar{R}_{zz}[l] = E\left\{ \begin{bmatrix} z_{n-1} \\ z_n[l] \end{bmatrix} [z_{n-1}^H z_n^H[l]] \right\} = \begin{bmatrix} R_{z_{n-1}z_{n-1}} & R_{z_{n-1}z_n[l]} \\ R_{z_{n-1}z_n[l]}^H & R_{z_n[l]z_n[l]} \end{bmatrix} \quad (17)$$

and cross-correlation vector $\bar{r}_{zt}[l]$ given, e.g., by $$\bar{r}_{zt}[l] = E\left\{ \begin{bmatrix} z_{n-1} \\ z_n[l] \end{bmatrix} h_t^* \right\} = \begin{bmatrix} r_{z_{n-1}h_t} \\ r_{z_n[l]h_t} \end{bmatrix}. \quad (18)$$

As to the submatrices of $\bar{R}_{zz}[l]$ used in the right term of equation (17) and the subvectors of $\bar{r}_{zt}[l]$ used in the right term of equation (18), reference is made to the Appendix further below.

Subspace filtering according to equation (15) based on partially transformed subspace filter coefficients $\bar{b}_t[l]$ is also denoted herein as iterative subspace filtering.

Figure 5:
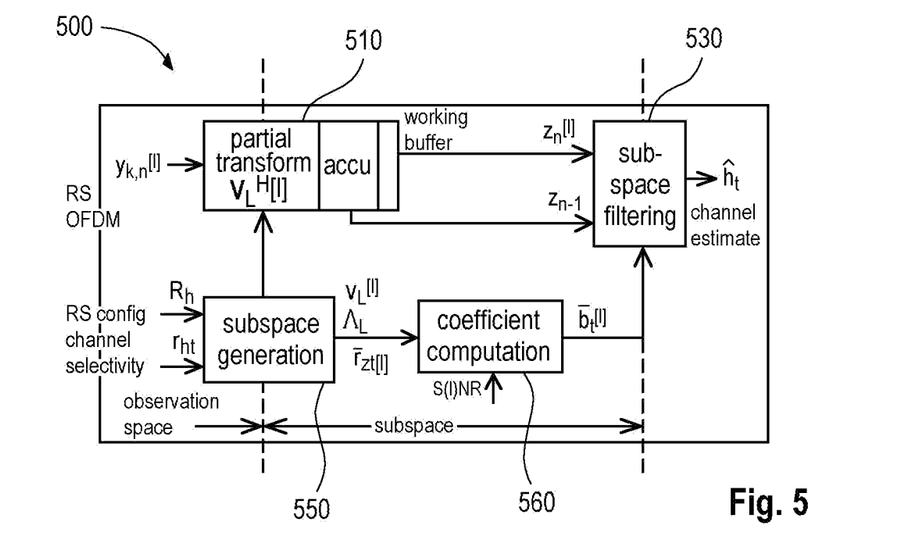
FIG. 5 is a block diagram illustrating an exemplary method of subspace channel estimation based on subspace-transformed reference symbols from a current partially transformed time-frequency observation block and based on subspace-transformed reference symbols from a past fully transformed time-frequency observation block.

FIG. 5 illustrates an example of a method and/or apparatus 500 for computing a channel coefficient $\hat{h}_t$ of a targeted RE by subspace filtering based on subspace-transformed reference symbols (RS) from a current partially transformed time-frequency observation block and based on subspace-transformed reference symbols (RS) (e.g., all subspace-transformed reference symbols) from a past fully transformed time-frequency observation block. Block 510 may relate to the computation associated with equations (14a). Block 530 may relate to subspace filtering associated with equation (15) and, e.g., equation (14b). Subspace filtering is performed at a rate higher than a time-frequency observation block rate. Block 550, which may receive the RS cross-block channel autocorrelation matrix $R_{hh,b}$ and the RS/RE channel cross-correlation vector $r_{h,i,t}$ as, e.g., computed by block 240 (not shown in FIG. 5), may relate to the computation associated with equations (17) and (18) in conjunction with the Appendix. Block 560 may relate to the computation associated with equation (16).

Further, the computation of block 560 may, e.g., be based on the signal-to-noise ratio (SNR) and/or the signal-to-noise plus interference ratio (SINR). By way of example, considering white Gaussian noise, the terms including $\sigma^2$ of equations (26a) and (26b) of the Appendix may be derived from the S(I)NR.

Figure 6:
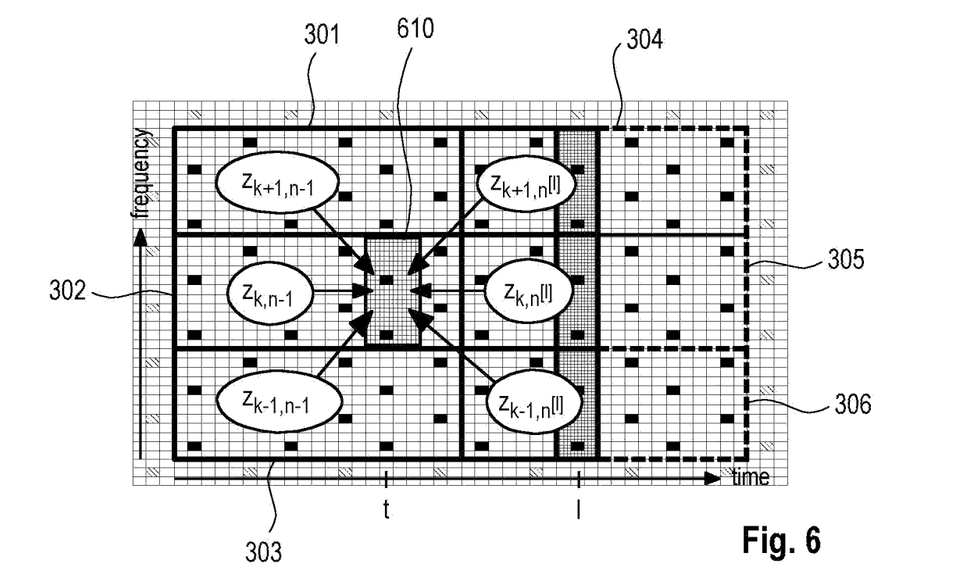
FIG. 6 is a frequency-time plane illustrating subspace channel estimation filtering based on at least one past fully transformed time-frequency observation block and at least one current partially transformed time-frequency observation block.

FIG. 6 shows by way of example a number of B=6 blocks 301, 302, 303, 304, 305, 306 which correspond to the blocks of identical reference number shown in FIG. 3. As depicted in FIG. 6, while the past blocks (e.g. blocks 301, 302 and 303) are fully transformed, the current blocks (e.g. blocks 304, 305 and 306) are only partially transformed up to OFDM index l (e.g., RS symbol l). Further, a target region 610 may be located in the center region of a region defined by the fully transformed blocks 301, 302, 303 and the transformed parts of partially transformed blocks 304, 305, 306. That is, subspace CE as exemplified by FIGS. 5 and 6 may use complete blocks 301, 302, 303 and uses partially transformed blocks 304, 305, 306 in the 2D F/T (frequency/time) plane in order to produce channel estimates for the target region 610.

As apparent from FIGS. 5 and 6, the (iterative) subspace filtering in block 530 may be based on subspace-transformed RSs from at least one current partially transformed time-frequency observation block (e.g., one or more of blocks 304, 305, 306).

As apparent from FIGS. 5 and 6, the (iterative) subspace filtering may be based on subspace-transformed RSs from a plurality of current partially transformed time-frequency observation blocks (e.g., blocks 304, 305, 306), the plurality of partially transformed time-frequency observation blocks may be arranged coincident in time dimension and adjacent to one another in frequency dimension.

As apparent from FIGS. 5 and 6, the subspace-transformed RSs at time instant l from the current partially transformed time-frequency observation block may be generated for the subspace filtering to generate the channel estimate at target time instant t.

As apparent from FIGS. 5 and 6, the (iterative) subspace filtering may further be based on RSs from at least one past fully transformed time-frequency observation block (e.g., one or more of blocks 301, 302, 303).

As apparent from FIGS. 5 and 6, the (iterative) subspace filtering may further be based on all subspace-transformed RSs of a plurality of past fully transformed time-frequency observation blocks (e.g., blocks 301, 302, 303), the plurality of past fully transformed time-frequency observation blocks are arranged coincident in time dimension and adjacent to one another in frequency dimension.

As mentioned above, the block size of the blocks 301, 302, 303, 304, 305, 306 is an adjustable and time variable computational parameter and may, e.g., be set close to the channel coherence length $L_c$ in either direction. In particular, the bock size in frequency and/or time may be adapted based on one or both of a Doppler spread measurement and a delay spread measurement.

Moreover, the concept of partial block transformation and, e.g., iterative subspace filtering allows configuring any delay (lag) D between l (e.g. the latest RS symbol that has been received) and the targeted CE symbol at time instant t. The delay (or lag) D may be expressed by D=l−t.

According to an example the delay D may be fixed, i.e. set to a predetermined value independent of the actual instant of time l. In this case, a fixed-delay (or fixed-lag) filtering t=l−D is applied. According to another example, the delay D may be variably set (but always remain smaller than the block size in time direction). That way, the latency problem is solved by setting D (either as a fixed or variable quantity) appropriately and, e.g., independently of the block size.

Second Aspect of the Disclosure

According to a second aspect of the disclosure, block rate subspace filtering (e.g. as shown in FIG. 2) is replaced by an over block rate (i.e. iterative) subspace filtering according to the first aspect of the disclosure and further by generating a state estimate of the subspace-transformed channel. The generated state estimates of the subspace-transformed channel according to the second aspect may be used to improve the performance of subspace filtering according to the first aspect.

The state estimates of the subspace-transformed channel according to the second aspect may be generated by filtering in the subspace domain. That is, the process to be tracked is not the channel itself but the transformed channel $V^H h$.

More specifically, when intra-block accumulation according to, e.g., equation (13) is finished, completed blocks $z_{k,n}$ are frequency-aggregated (see left term of equation (14a)) to form $z_n$ and then post-processed (e.g. filtered) in order to generate a state $s_n$ which is an improved estimate of the transformed channel $V^H h_n$.

The transformed channel post-processing by filtering may, e.g., be carried out according to $$s_n = s_{n|n-1} + K_n(z_n - s_{n|n-1}) \quad (19a)$$

with $$s_{n|n-1} = A_n^H s_{n-1}, \quad (19b)$$

wherein equations (19a) and (19b) are an example of a specific kind of transformed channel post-processing by filtering, namely transformed channel Kalman filtering.

Equation (19b) expresses a conditional state prediction $s_{n|n-1}$, i.e. the prediction of state $s_n$ under the condition that state $s_{n-1}$ is known.

Equation (19a) expresses a state transition, i.e. the prediction of (unconditional) state $s_n$ from the conditional state prediction $s_{n|n-1}$ of state $s_n$ by means of filtering with Kalman gain $K_n$.

Combining conditional state prediction (equation (19b)) and state transition (equation (19a)), the Kalman filtering equation becomes $$s_n = (I - K_n) A_n^H s_{n-1} + K_n z_n = [(I - K_n) A_n^H \; K_n] \begin{bmatrix} s_{n-1} \\ z_n \end{bmatrix} = \Gamma_n \bar{z}_n, \quad (20)$$

wherein the recursions for prediction coefficients $A_n$, error covariance $P_n$ (prior/posterior combined), Kalman gain $K_n$, and state autocorrelation $R_{ss,n} = R_{s_n s_n}$, respectively, may be evaluated as $$A_n = R_{ss,n-1}^{-1} R_{s_{n-1} z_n} \quad (21a)$$

$$P_n = (I - K_{n-1}) P_{n-1} \quad (21b)$$

$$K_n = P_n (P_n + \sigma^2 I)^{-1} \quad (21c)$$

$$R_{ss,n} \Gamma_n \bar{R}_{zz,n} \Gamma_n^H \quad (21d)$$

$$\Gamma_n = [(I - K_n) A_n^H \; K_n], \quad (21e)$$

wherein $A_n^H$ defines the state dynamics of Kalman filtering.

When combining iterative subspace filtering with transformed channel post-processing (e.g. Kalman filtering of equations (19a), (19b)) according to the second aspect of the disclosure, the autocorrelation matrix $\bar{R}_{zz}[l]$ and the cross-correlation vector $\bar{r}_{zt}[l]$ are computed in a similar fashion as in equations (17) and (18) without Kalman filtering, however with $z_{n-1}$ in equation (14b) which is the estimate of subspace channel $V^H h_n$ replaced by its improved version, i.e., state $s_{n-1}$. That is, time-aggregation equation (14b) without post-processing of the transformed channel may be replaced by new time-aggregation equation with transformed channel post-processing $$\bar{z}[l] = \begin{bmatrix} s_{n-1} \\ z_n[l] \end{bmatrix} \quad (22)$$

by aggregating the previous state $s_{n-1}$ and the current (incomplete) block $z_n[l]$.

While post-processing (e.g. Kalman filtering) is performed per block (index n), subspace filtering may be performed per new RS-OFDM symbol l received, in order to produce the final channel estimate from the previous state $s_{n-1}$ and the current (incomplete) block $z_n[l]$, see equation (22). In other words, while transformed channel post-processing may be performed at block rate, subspace filtering may be performed at RS-OFDM symbol rate.

Transformed channel Kalman filtering is also denoted herein as transformed channel Kalman tracking. Kalman tracking is only one of a variety of transformed channel post processing possibilities. E.g., transformed channel postprocessing (i.e. transformed channel tracking) may, e.g., include one or more of the group consisting of Kalman filtering, AR-filtering, RLS-filtering and IIR filtering with fixed or adaptive forgetting factor (AR: AutoRegressive; RLS: Recursive Least Square; IIR: Infinite Impulse Response).

Iterative subspace filtering (additionally based on transformed channel post-processing) may then be given by $$\hat{h}_t = \bar{b}_t^H[l] \bar{z}[l] \quad (23)$$

with coefficients $$\bar{b}_t[l] = \bar{R}_{zz}[l]^{-1} \bar{r}_{zt}[l] \quad (24)$$

in accordance with equations (15) and (16), respectively.

Note that coefficients $\bar{b}_t[l]$ depend on both the latest OFDM index l and the target index t, hence the adjustable latency D=l−t. Note also that coefficients $\bar{b}_t[l]$ of equation (24) are different from those of equation (16) because the former considers transformed channel post-processing (e.g. Kalman filtering) with $s_{n-1}$ in $\bar{z}[l]$ according to equation (22) while the latter does not ($z_{n-1}$ in $\bar{z}[l]$ according to equation (14b)). As mentioned above, the latency D=l−t may be set to a desired arbitrary fixed value, or may be variably set, e.g., within a predetermined range, and may, e.g., be set independent from the setting of the block size.

Figure 7:
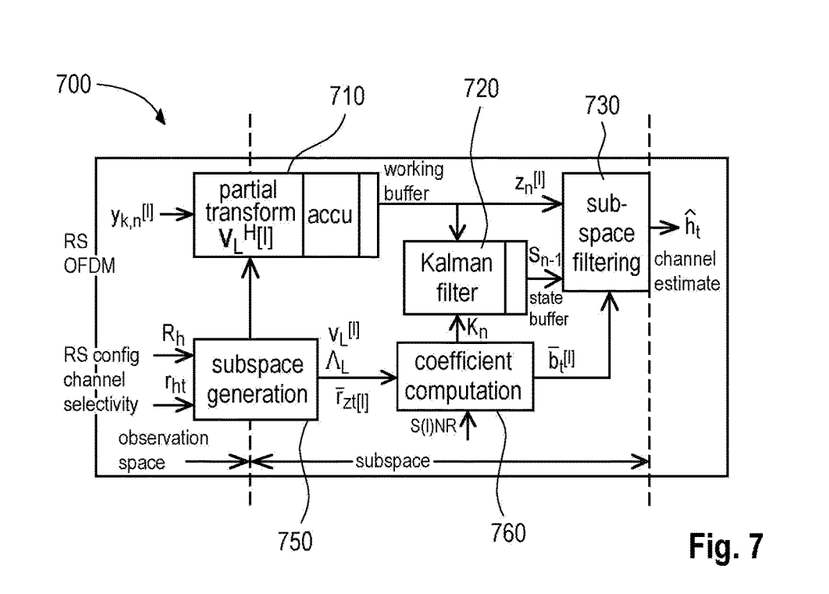
FIG. 7 is a block diagram illustrating an exemplary method of subspace channel estimation based on subspace-transformed reference symbols from a current partially transformed time-frequency observation block and based on transformed channel post-processing in the subspace to generate a state estimate of the subspace-transformed channel.

An aspect of the disclosure exhibiting iterative subspace CE processing with transformed channel post-processing (e.g. Kalman tracking) is illustrated in FIG. 7.

FIG. 7 illustrates an example of a method and/or apparatus 700 for computing a channel coefficient $\hat{h}_t$ of a targeted RE by subspace filtering based on subspace-transformed RSs from a current partially transformed time-frequency observation block and based on subspace-transformed RSs from a past fully transformed time-frequency observation block. Further, the method and/or apparatus 700 uses state estimates of the subspace-transformed channel according to the second aspect of the disclosure.

Block 710 may correspond to block 510 and may relate to the computation associated with equation (14a). Block 730 may relate to subspace filtering associated with equation (23) and, e.g., equation (22). Subspace filtering is performed at a rate higher than a time-frequency observation block rate. Block 750, which may receive the RS cross-block channel autocorrelation matrix $R_{hh,b}$ and the RS/RE channel cross-correlation vector $r_{h,i,t}$ as, e.g., computed by block 240 (not shown in FIG. 7), may relate to the computation associated with equations (17) and (18) in conjunction with the Appendix. Block 760 may relate to the computation associated with equations (24) and (21a-d). Block 720 may perform transformed channel post-processing and may, e.g., relate to the state generation computation associated with equation (20).

Further, the computation in block 760 may, e.g., be based on the signal-to-noise ratio (SNR) and/or the signal-to-noise plus interference ratio (SINR). By way of example, considering white Gaussian noise, the term $\sigma^2 I$ of equation (21c) may be derived from the S(I)NR.

As to an example of RE grid processing (i.e. observation channel tracking) used by the method and/or apparatus 700, reference is made to FIG. 6 to avoid reiteration. Thus, while the past blocks (e.g. blocks 301, 302 and 303) are fully transformed, the current blocks (e.g. blocks 304, 305 and 306) are only partially transformed up to OFDM index l (e.g., RS symbol 1).

The target region 610 including t may again be located in the center region of a region defined by the fully transformed blocks 301, 302, 303 and the transformed parts of the partially transformed blocks 304, 305, 306. That is, subspace CE as exemplified by FIGS. 6 and 7 uses complete blocks 301, 302, 303 and partially transformed blocks 304, 305, 306 in the 2D F/T (frequency/time) plane in order to produce channel estimates for the target region 610 by transformed channel post-processing according to the second aspect of the disclosure.

As apparent from FIGS. 6 and 7, the transformed channel post-processing in the subspace may be used to generate a state estimate of the subspace-transformed channel. The subspace filtering may then be performed at the multiple time instants l based on $z_n[l]$ and further based on the state estimate $s_{n-1}$ of the subspace-transformed channel.

As apparent from FIGS. 6 and 7, the transformed channel post-processing may be based on subspace-transformed reference symbols of a past fully transformed time-frequency observation block.

As apparent from FIGS. 6 and 7, the transformed channel post-processing may be performed on time-frequency observation block rate.

As apparent from FIGS. 6 and 7, filter coefficients used for the transformed channel post-processing may be time-variant, in particular time-variant per time-frequency observation block (i.e. time-variant on block rate).

Figure 8:
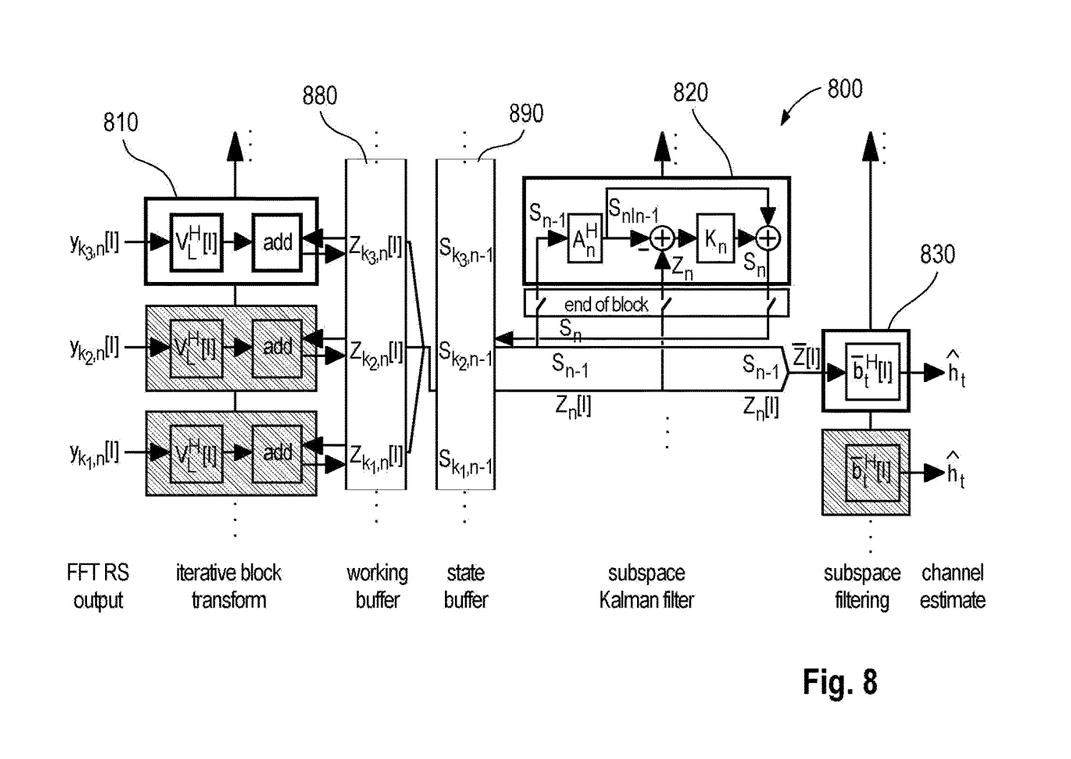
FIG. 8 is a block diagram illustrating exemplary computational processing and buffer allocation of subspace channel estimation based on subspace-transformed reference symbols from a current partially transformed time-frequency observation block and based on transformed channel post-processing in the subspace to generate a state estimate of the subspace-transformed channel.

FIG. 8 illustrates an example 800 of computational processing and buffer allocation of subspace channel estimation according to the second aspect of the disclosure (i.e. including transformed channel post-processing by, e.g., Kalman tracking).

RS-OFDM symbol blocks $y_{k,n}[l]$ are transformed into subspace and accumulated by iterative block transform 810. In view of optional frequency aggregation, iterative block transform 810 may process RS-OFDM symbol blocks $y_{k,n}[l]$ of different k and same n in parallel (see hatched blocks below iterative block transform 810). Iterative block transform 810 may correspond to blocks 510, 710 of FIGS. 5 and 7, respectively. Further, FIG. 8 shows a working buffer 880 and a state buffer 890 which could also be implemented in an apparatus 700 as illustrated in FIG. 7.

The resulting $z_{k,n}[l]$ output from iterative block transform 810 may be stored in the working buffer 880 until the next RS-OFDM symbol arrives. Simultaneously, $z_{k,n}[l]$ may be frequency-aggregated (forming $z_n[l]$, see equation (14a)) and time-aggregated with previous state $s_{n-1}$ (forming $\bar{z}[l]$, see equation (22)). The previous state $s_{n-1}$ may be read out from the state buffer 890.

The $\bar{z}[l]$ are then subspace-filtered in subspace filter 830 (corresponding to block 730) to estimate the channel $\hat{h}_t = \bar{b}_t^H[l]\bar{z}[l]$ (see equation (23)).

Further, a transformed channel post-processing filter 820 (corresponding to block 720) is shown. Each time a block is finished, the completed frequency-aggregated $z_n$ and previous state $s_{n-1}$ are filtered (e.g. Kalman-filtered) to form state $s_n$ which is finally written back to state buffer 890 (in-place).

When recursions have converged, the transformed channel post-processing filter 820 (e.g. Kalman filter) may switch to steady-state quantities $A_\infty$, $K_\infty$, $P_\infty$, and $R_{ss,\infty}$ (see equations (21a)-(21d)).

Note that only two buffers 880, 890 may be needed, and all quantities are in the reduced-size subspace domain (no need for storing RS samples). Hence, the memory requirement of the apparatus 700 is small and, e.g., comparable to that of IIR filtering.

For both CE filtering and coefficient generation, the complexity of critical computations is much reduced since they are all done in the low-rank subspace where matrices are of smaller size (e.g., 2 LB×2 LB) and often better conditioned. Also, coefficients may either be generated offline or on the fly per each new RS symbol.

As the input data may not be buffered but immediately projected, accumulated, and stored in-place, the input data is efficiently represented by $\bar{z}[l]$ whose dimension 2 LB is constant. The state buffer 890 (hosting $z_{n-1}$ without transformed channel post-processing and $s_{n-1}$ with transformed channel post-processing) is also of fixed size, so the total memory requirement may be kept constant over time.

Figure 9A:
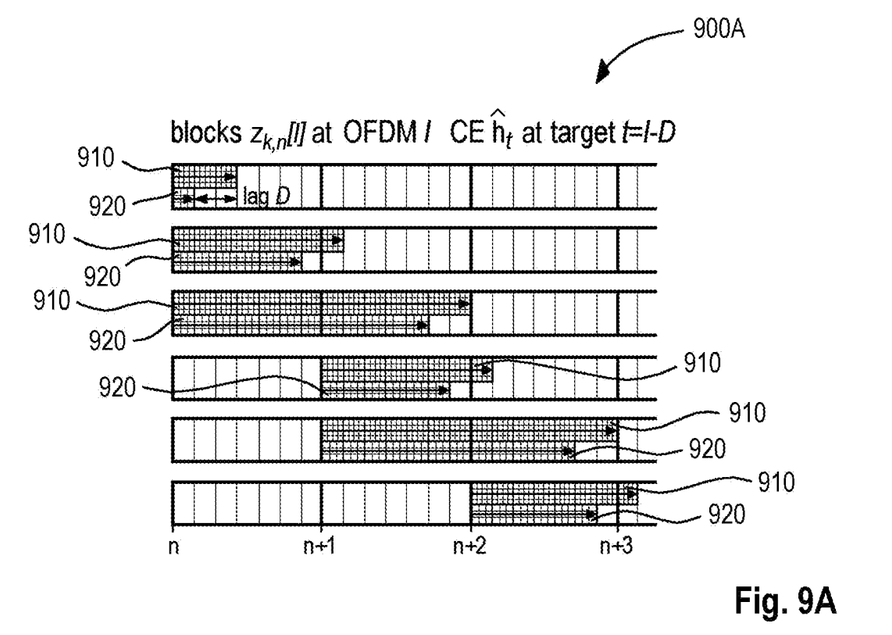
FIGS. 9A and 9B are timing diagrams illustrating subspace channel estimation processing without and with transformed channel post-processing in subspace, respectively.
Figure 9B:
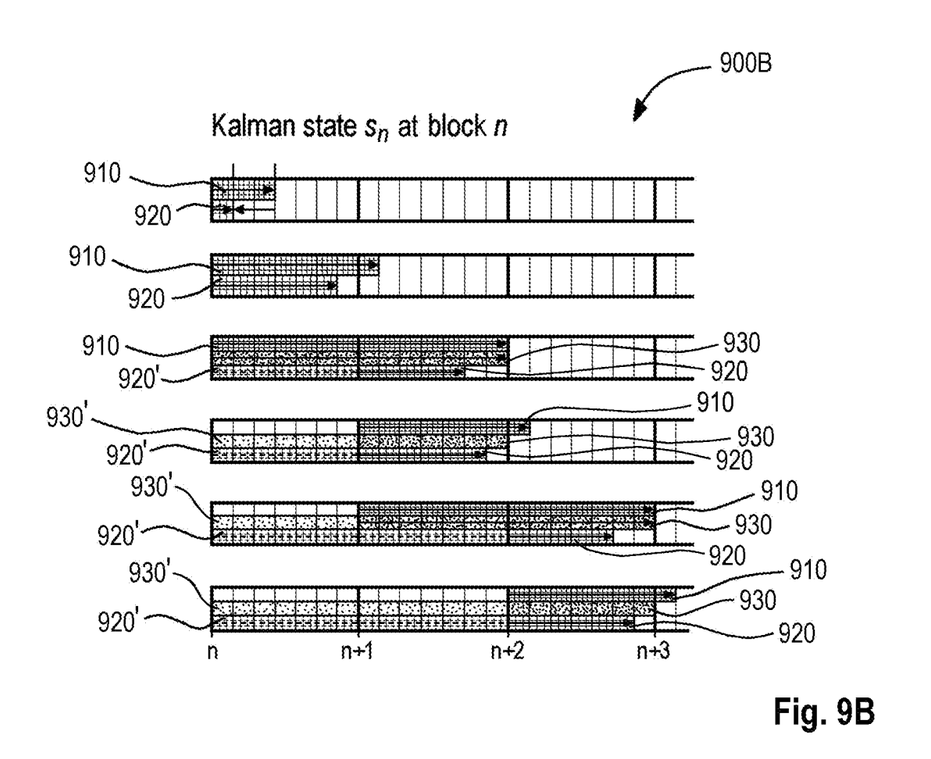
Figure 10A:
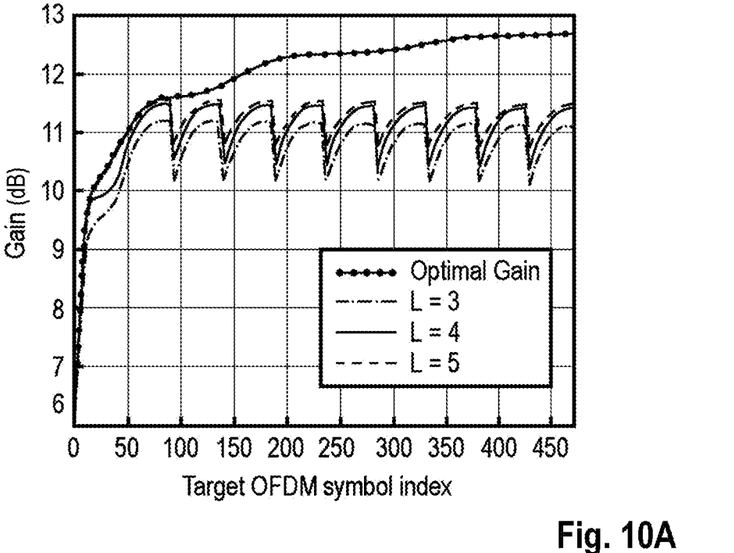
FIGS. 10A and 10B are performance diagrams illustrating the channel estimation gain versus OFDM target symbol index for different subspace dimensions L without and with transformed channel post-processing in subspace, respectively.
Figure 10B:
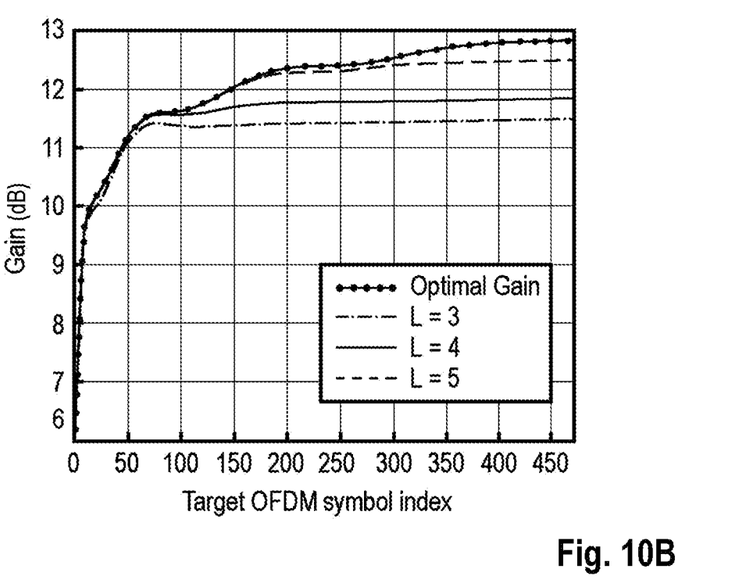

FIGS. 9A and 9B illustrate the operation of fixed-delay (t=l−D) iterative subspace channel estimation without transformed channel post-processing (i.e. according the first aspect of the disclosure) and with transformed channel post-processing (i.e. i.e. according the second aspect of the disclosure), respectively. Progress in time is illustrated by top to bottom processing rows. FIGS. 10A and 10B illustrate the corresponding performance in terms of channel estimation (CE) gain versus OFDM target symbol index for different subspace dimensions L=3, 4 and 5. The observation block dimension N (number of reference symbols within the time-frequency observation block) is N=12 in these simulations.

During operation 900A without transformed channel post-processing (e.g. Kalman tracking) as shown in FIG. 9A, only the past block and the present block up to OFDM symbol l (i.e. subspace partially transformed RSs block $z_{k,n}[l]$ at 910) are used for filtering. The fixed-delay (t=l−D) channel estimates $\hat{h}_t$ (equation (15)) are shown at 920.

Past block switching as illustrated in FIG. 9A (from n to n+1 and from n+1 to n+2) produces the periodic kinks in performance seen in FIG. 10A. Further, FIG. 10A illustrates the effect of subspace dimension L on CE gain. While changing L=3 to L=4 provides for a considerable improvement in performance, the increase in performance from L=4 to L=5 is less pronounced.

During operation 900B with transformed channel post-processing (with, e.g., Kalman tracking), block-switching and fixed-delay (t=l−D) channel estimation are processed the same way as in FIG. 9A. However, information from the entire past (not only the past block as in operation 900A) is used and condensed in channel state $s_{n-1}$ shown at 930. This information also shows up in the final channel estimate $\hat{h}_t$ (equation (23)) shown at 920. This implicit past information of 920 and 930 are indicated at 920' and 930'.

This makes near-optimal performance achievable (FIG. 10B), in particular for L=4 or L=5. Even for small subspace dimension L=3, the CE performance of operation 900B is better than for L=5 of operation 900A. Further, the kinks caused by block switching in operation 900A are smoothed out in operation 900B by using the channel states containing implicit past information.

Hence, iterative subspace filtering with transformed channel post-processing (e.g. Kalman tracking) features FIR-like performance (FIG. 10B) at only the cost of IIR-like memory footprint (i.e., only two buffers of reduced size are used compared to RS buffers, see FIG. 8).

Further, in general, the increase of CE performance of, e.g., operation 900A or 900B may enable shortening blocks in time direction (with respect to time coherence $L_c$). Thereby the subspace dimension L can be reduced further without negative performance impact.

In conclusion, without transformed channel post-processing (e.g. Kalman tracking), only the past and part of the current block are used, but thanks to frequency aggregation, performance can already be satisfactory for some use cases, perhaps except at the block boundaries where the oldest block is dropped and a new one started (FIGS. 9A, 10A). With transformed channel post-processing (e.g. Kalman tracking), the information about the entire past is effectively used, making near-optimal performance achievable with subspace dimension L as small as 4, 3, or even 2 at low SNR (FIGS. 9B, 10B). Given the RS and channel parameter configuration, it is possible to find an optimal combination of subspace dimension L and block length for which a certain tolerance threshold value (e.g., 1 dB loss with respect to the optimum but very large Wiener filter CE gain) is not exceeded.

An example of the disclosure may therefore include providing a desired CE gain threshold and/or a desired maximum latency; and determine a subspace dimension L and/or block length for which the desired CE gain threshold is not underrun and/or the desired maximum latency is not exceeded.

An example of the disclosure may include adapting the block size based on the delay and/or Doppler spread. More specifically, the disclosure may include decreasing the block size for increasing delay spreads and/or Doppler spreads and/or increasing the block size for decreasing delay spreads and/or Doppler spreads. CE operation with block size adaptation allows to appropriately control CE gain and latency.

A characteristic of subspace CE is that if a large error is applied to a single RS sample (e.g. by varying its position in each repetition during a continual data transmission (static configuration, fully allocated PRB)), the performance (e.g. CE gain, LLR, ACK/NACK, or CQI) of the Device Under Test (DUT) at all RE in the vicinity of the disturbed RS sample will decrease for all RE inside a certain F/T plane and will remain unchanged (good) for all RE outside of said F/T plane.

Another characteristic of subspace CE is that for a fixed delay/Doppler spread and block size identified, if a strong disturbance is applied to the RS samples of a block, given this disturbance is taken from the suspected null space (e.g., eigenvector), the performance will be found to be close to that of the undisturbed case while if the disturbance is taken from white noise of the same power, the performance will be substantially worse.

A characteristic of (iterative) subspace filtering (with or without transformed channel post-processing) based on partly transformed observation blocks is that the CE latency between OFDM symbol input and channel estimation output (symbol detection) is smaller than the block length.

A characteristic of (iterative) subspace filtering based on partly transformed observation blocks without transformed channel post-processing is that for a fixed delay spread/Doppler spread under quiescent conditions (e.g. no or small RS error), the performance (e.g. CE gain) versus OFDM symbol follows a periodic pattern, see e.g. FIG. 10A.

A characteristic of (iterative) subspace filtering based on partly transformed observation blocks with transformed channel post-processing (e.g. with Kalman tracking) is that under quiescent conditions (no RS error) the CE performance versus OFDM symbol follows a pattern similar to that of FIG. 10B and the steady-state CE gain is close to optimum. Further, if a very large error is applied to the first RS-OFDM symbol of the first block in a longer frame, the performance becomes very bad for the first block but then will show a step-wise (step size=block length) ring-out response as the frame progresses. This is because information from the entire past (not only the past block as in non-Kalman tracking operation 900A) is used and condensed in state $s_{n-1}$.

The present disclosure also supports a computer program including computer executable code or computer executable instructions that, when executed, causes at least one computer to execute the computing blocks described herein. Such a computer program product may include a nontransient readable storage medium storing program code thereon for use by a processor, the program code including instructions for performing the methods or the computing blocks as described herein.

APPENDIX

Starting with iterative subspace processing, the autocorrelation matrix $\bar{R}_{zz}[l]$ and cross-correlation vector $\bar{r}_{zt}[l]$ needed to compute subspace coefficients $\bar{b}_t$ (equation (16)) are expanded as $$\bar{R}_{zz}[l] = E\left\{\begin{bmatrix} z_{n-1} \\ z_n[l] \end{bmatrix} [z_{n-1}^H \, z_n^H[l]]\right\} = \begin{bmatrix} R_{z_{n-1}z_{n-1}} & R_{z_{n-1}z_n[l]} \\ R_{z_{n-1}z_n[l]}^H & R_{z_n[l]z_n[l]} \end{bmatrix} \quad (25a)$$

-continued and $$\bar{r}_{zt}[l] = E\left\{\begin{bmatrix} z_{n-1} \\ z_n[l] \end{bmatrix} h_t^*\right\} = \begin{bmatrix} r_{z_{n-1}h_t} \\ r_{z_n[l]h_t} \end{bmatrix} \quad (25b)$$

with submatrices (of $\bar{R}_{zz}[l]$)

$$R_{z_{n-1}z_{n-1}} = \begin{bmatrix} \Lambda_{L,1} & \cdots & \Lambda_{L,B} \\ \vdots & \ddots & \vdots \\ \Lambda_{L,B}^H & \cdots & \Lambda_{L,1} \end{bmatrix} + \sigma^2 I \quad (26a)$$

($\Lambda_{L,b} = V_L^H R_{hh,b} V_L$ correlation between previous blocks $z_{k,n-1}$ and $z_{k+b,n-1}$), $$R_{z_n[l]z_n[l]} = \begin{bmatrix} \Lambda_{L,1}[1:l] & \cdots & \Lambda_{L,B}[1:l] \\ \vdots & \ddots & \vdots \\ \Lambda_{L,B,}^H[1:l] & \cdots & \Lambda_{L,1}[1:l] \end{bmatrix} + \sigma^2 V_L^H[1:l]V_L[1:l] \quad (26b)$$

($\Lambda_{L,b}[1:l] = V_L^H[1:l] R_{hh,b}[1:l] V_L[1:l]$ correlation between current blocks $z_{k,n}[l]$ and $z_{k+b,n}[l]$), $$R_{z_{n-1}z_n[l]} = \begin{bmatrix} \Lambda_{L,1,1}[1:l] & \cdots & \Lambda_{L,B,1}[1:l] \\ \vdots & \ddots & \vdots \\ \Lambda_{L,B,1}^H[1:l] & \cdots & \Lambda_{L,1,1}[1:l] \end{bmatrix} \quad (26c)$$

($\Lambda_{L,b,1}[1:l] = V_L^H R_{hh,b,1}[1:l] V_L[1:l]$ correlation between previous block $z_{k,n-1}$ and current block $z_{k+b,n}[1:l]$), and subvectors (of $\bar{r}_{zt}[l]$)

$$r_{z_{n-1}h_t} = \begin{bmatrix} r_{1,n-1,t} \\ \vdots \\ r_{B,n-1,t} \end{bmatrix} \quad (27a)$$

($r_{b,n-1,t} = V_L^H E\{h_{k_b,n-1} h_t^*\}$ correlation between previous block $z_{k,n-1}$ and target $h_t$), $$r_{z_n[l]h_t} = \begin{bmatrix} r_{1,n,t}[1:l] \\ \vdots \\ r_{B,n,t}[1:l] \end{bmatrix} \quad (27b)$$

($r_{b,n,t}[l] = V_L^H[1:l] E\{h_{k_b,n}[1:l] h_t^*\}$ correlation between current block $z_{k,n}[l]$ and target $h_t$).

Note that all of these quantities (equations (26a-c), (27a-b)) are computable offline or online in the course of filtering, and matrices (equations (26a-c)) are well conditioned (diagonal $\Lambda_{L,0}$), with the possible exception of equation (26b) at the start (l=1) of long blocks.

EXAMPLES

The following examples pertain to further aspects of the disclosure. Example 1 is a method of generating channel estimates of a communication channel in an OFDM system, including: receiving reference symbols from at least one time-frequency observation block of a predetermined block size in frequency and time; generating subspace-transformed reference symbols from the received reference symbols; and subspace filtering the subspace-transformed reference symbols to generate a channel estimate for a communication channel target time; wherein a latency between a communication channel time instant of a currently received reference symbol and the communication channel target time is smaller than the observation block size in time.

In Example 2, the subject matter of Example 1 can optionally include that the subspace filtering is based on subspace-transformed reference symbols from a current incompletely subspace-transformed time-frequency observation block.

In Example 3, the subject matter of Example 2 can optionally include that the current incompletely transformed time-frequency observation block includes reference symbols received up to the communication channel time instant of the currently received reference symbol.

In Example 4, the subject matter of any one of Examples 2-3 can optionally include that the subspace filtering is based on subspace-transformed reference symbols from a plurality of current incompletely subspace-transformed time-frequency observation blocks, the plurality of current incompletely subspace-transformed time-frequency observation blocks are arranged coincident in time dimension and adjacent to one another in frequency dimension.

In Example 5, the subject matter of any one of Examples 2-4 can optionally include that the subspace filtering is further based on subspace-transformed reference symbols from a past fully subspace-transformed time-frequency observation block.

In Example 6, the subject matter of any one of Examples 2-5 can optionally include that the subspace filtering is further based on subspace-transformed reference symbols of a plurality of past fully subspace-transformed time-frequency observation blocks, the plurality of past fully subspace-transformed time-frequency observation blocks are arranged coincident in time dimension and adjacent to one another in frequency dimension.

In Example 7, the subject matter of any one of Examples 1-6 can optionally include generating a plurality of subspace channel estimation filter coefficients for the time instant of the currently received reference symbol; and using the plurality of subspace channel estimation filter coefficients for subspace filtering of the subspace-transformed reference symbols to generate the channel estimate for the communication channel target time.

In Example 8, the subject matter of any one of Examples 1-7 can optionally include that a dimension L of the subspace is smaller than a number N of reference symbols within the time-frequency observation block.

In Example 9, the subject matter of any one of Examples 1-8 can optionally include that the latency is set to a fixed predetermined value through subspace filtering of the at least one time-frequency observation block.

In Example 10, the subject matter of any one of Examples 1-9 can optionally include that the subspace filtering is performed on a rate higher than a time-frequency observation block rate.

In Example 11, the subject matter of any one of Examples 1-10 9 can optionally include that a subspace transformation to generate the subspace-transformed reference symbols is based on an eigenvector decomposition of a channel autocorrelation matrix.

In Example 12, the subject matter of any one of Examples 1-11 can optionally include adapting the bock size in frequency or time based on one or both of a Doppler spread and a delay spread.

In Example 13, the subject matter of any one of Examples 1-12 can optionally include performing transformed channel post-processing in the subspace to generate a state estimate of the subspace-transformed channel; and performing the subspace filtering based further on the state estimate of the subspace-transformed channel.

In Example 14, the subject matter of Example 13 can optionally include that transformed channel post-processing is based on subspace-transformed reference symbols of a past fully transformed time-frequency observation block.

In Example 15, the subject matter of any one of Examples 13-14 can optionally include that transformed channel post-processing is performed on time-frequency observation block rate.

In Example 16, the subject matter of any one of Examples 13-15 can optionally include that transformed channel post-processing includes one or more of the group consisting of Kalman-filtering, AR-filtering, RLS-filtering, and IIR filtering with fixed or adaptive forgetting factor.

In Example 17, the subject matter of any one of Examples 13-16 can optionally include that filter coefficients used for the transformed channel post-processing are time-variant, in particular time-variant per time-frequency observation block.

In Example 18, the subject matter of any one of Examples 13-17 can optionally include that filter coefficients used for the transformed channel post-processing are time-invariant after lapse of a convergence period.

In Example 19, the subject matter of any one of Examples 13-18 can optionally include that the subspace filtering is based on a plurality of state estimates of the subspace-transformed channel, wherein the plurality of state estimates are based on subspace-transformed reference symbols of a plurality of past fully transformed time-frequency observation block which are arranged coincident in time dimension and adjacent to one another in frequency dimension.

Example 20 is a computer readable non-transitory medium on which computer instructions are stored which when executed by a computer cause the computer to perform the method of any one of Examples 1 to 19.

Example 21 is a data processing apparatus including means for carrying out the method of any one of Examples 1 to 19.

Example 22 is a computer program including instructions which, when the program is executed by a computer, causes the computer to carry out the method of any one of Examples 1 to 19.

Example 23 is a device for generating channel estimates of a communication channel in an OFDM system, including a subspace transformer to generate subspace-transformed reference symbols from received reference symbols of at least one time-frequency observation block of a predetermined block size in frequency and time; and a subspace filter to generate a channel estimate for a communication channel target time by filtering the subspace-transformed reference symbols; wherein a latency between a communication channel time instant of a currently received reference symbol and the communication channel target time is smaller than the observation block size in time.

In Example 24, the subject matter of Example 23 can optionally include that the subspace filter is configured to filter subspace-transformed reference symbols from a current incompletely subspace-transformed time-frequency observation block.

In Example 25, the subject matter of Examples 23-24 can optionally include that the current incompletely transformed time-frequency observation block includes reference symbols received up to the communication channel time instant of the currently received reference symbol.

In Example 26, the subject matter of Examples 23-25 can optionally include a coefficient computation means to generate a plurality of subspace channel estimation filter coefficients for the time instant of the currently received reference symbol; wherein the subspace filter is configured to generate the channel estimate for the communication channel target time by filtering the subspace-transformed reference symbols based on the subspace channel estimation filter coefficients.

In Example 27, the subject matter of Examples 23-26 can optionally include a transformed channel post-processing filter to generate a state estimate of the subspace-transformed channel, wherein the subspace filter performs subspace filtering based further on the state estimate of the subspace-transformed channel.

In Example 28, the subject matter of Examples 23-27 can optionally include that a state estimate of the subspace-transformed channel is based on subspace-transformed reference symbols of a past fully transformed time-frequency observation block.

In Example 29, the subject matter of Examples 23-28 can optionally include that the transformed channel postprocessing filer includes one or more of the group consisting of a Kalman-filter, an AR-filter, a RLS-filter, and an IIR filter with fixed or adaptive forgetting factor.

The invention claimed is:

1. A method of generating channel estimates of a communication channel in an OFDM system, comprising:
   receiving reference symbols from at least one time frequency observation block of a predetermined block size in frequency and time;
   generating subspace-transformed reference symbols from the received reference symbols; and
   subspace filtering the subspace-transformed reference symbols to generate a channel estimate for a communication channel target time;
   wherein a latency between a communication channel time instant of a currently received reference symbol and the communication channel target time is smaller than the observation block size in time.

2. The method of claim 1, wherein the subspace filtering is based on subspace-transformed reference symbols from a current incompletely subspace-transformed time-frequency observation block.

3. The method of claim 2, wherein the current incompletely transformed time-frequency observation block includes reference symbols received up to the communication channel time instant of the currently received reference symbol.

4. The method of claim 2, wherein the subspace filtering is based on subspace-transformed reference symbols from a plurality of current incompletely subspace-transformed time-frequency observation blocks, the plurality of current incompletely subspace-transformed time-frequency observation blocks are arranged coincident in time dimension and adjacent to one another in frequency dimension.

5. The method of claim 2, wherein the subspace filtering is further based on subspace-transformed reference symbols from a past fully subspace-transformed time-frequency observation block.

6. The method of claim 5, wherein the subspace filtering is further based on subspace-transformed reference symbols of a plurality of past fully subspace-transformed time-frequency observation blocks, the plurality of past fully subspace transformed time-frequency observation blocks are arranged coincident in time dimension and adjacent to one another in frequency dimension.

7. The method of claim 1, wherein the latency is set to a fixed predetermined value through subspace filtering of the at least one time-frequency observation block.

8. The method of claim 1, further comprising:
performing transformed channel post-processing in the subspace to generate a state estimate of the subspace transformed channel; and
performing the subspace filtering based further on the state estimate of the subspace-transformed channel.

9. The method of claim 8, wherein transformed channel postprocessing is performed on time-frequency observation block rate.

10. The method of claim 8, wherein transformed channel post-processing comprises one or more of the group consisting of Kalman-filtering, AR-filtering, RLS-filtering, and IIR filtering with fixed or adaptive forgetting factor.

11. The method of claim 8, wherein the subspace filtering is based on a plurality of state estimates of the subspace-transformed channel, wherein the plurality of state estimates are based on subspace-transformed reference symbols of a plurality of past fully transformed time frequency observation block which are arranged coincident in time dimension and adjacent to one another in frequency dimension.

12. A non-transitory computer readable medium, comprising instructions which, if executed, cause one or more processors to receive reference symbols from at least one time frequency observation block of a predetermined block size in frequency and time;
generate subspace-transformed reference symbols from the received reference symbols; and
subspace filter the subspace-transformed reference symbols to generate a channel estimate for a communication channel target time;
wherein a latency between a communication channel time instant of a currently received reference symbol and the communication channel target time is smaller than the observation block size in time.

13. A device for generating channel estimates of a communication channel in an OFDM system, comprising:
a subspace transformer to generate subspace-transformed reference symbols from received reference symbols of at least one time-frequency observation block of a predetermined block size in frequency and time; and
a subspace filter to generate a channel estimate for a communication channel target time by filtering the subspace transformed reference symbols;
wherein a latency between a communication channel time instant of a currently received reference symbol and the communication channel target time is smaller than the observation block size in time.

14. The device of claim 13, wherein the subspace filter is configured to filter subspace-transformed reference symbols from a current incompletely subspace-transformed time frequency observation block.

15. The device of claim 13, further comprising:
a transformed channel post-processing filter to generate a state estimate of the subspace-transformed channel, wherein the subspace filter performs subspace filtering based further on the state estimate of the subspace-transformed channel.

* * * * *